(12) United States Patent
Wang et al.

(10) Patent No.: US 9,258,068 B2
(45) Date of Patent: Feb. 9, 2016

(54) RRM MEASUREMENTS FOR UES WITH INTERFERENCE SUPPRESSION RECEIVER

(75) Inventors: Yuanye Wang, San Diego, CA (US); Klaus Ingemann Pedersen, Aalborg (DK)

(73) Assignee: Nokia Solutions and Networks Oy, Espoo (FI)

(*) Notice: Subject to any disclaimer, the term of this patent is extended or adjusted under 35 U.S.C. 154(b) by 115 days.

(21) Appl. No.: 14/113,443

(22) PCT Filed: Apr. 28, 2011

(86) PCT No.: PCT/EP2011/056780
§ 371 (c)(1),
(2), (4) Date: Oct. 23, 2013

(87) PCT Pub. No.: WO2012/146294
PCT Pub. Date: Nov. 1, 2012

(65) Prior Publication Data
US 2014/0057583 A1    Feb. 27, 2014

(51) Int. Cl.
*H04B 17/00* (2015.01)
*H04B 17/309* (2015.01)
*H04B 17/318* (2015.01)
*H04B 17/382* (2015.01)

(52) U.S. Cl.
CPC .......... *H04B 17/0042* (2013.01); *H04B 17/309* (2015.01); *H04B 17/318* (2015.01); *H04B 17/382* (2015.01)

(58) Field of Classification Search
CPC .................................................. H04B 17/0042
USPC .................... 455/226.1, 132, 277, 226.2, 272
See application file for complete search history.

(56) References Cited

U.S. PATENT DOCUMENTS

| | | | |
|---|---|---|---|
| 7,532,664 B2* | 5/2009 | Rimini et al. | 375/150 |
| 2007/0201569 A1 | 8/2007 | Pajukoski et al. | 375/260 |
| 2008/0107163 A1* | 5/2008 | Goransson | 375/225 |

FOREIGN PATENT DOCUMENTS

WO    WO2008/001230 A1    1/2008

OTHER PUBLICATIONS

3GPP TS 36.214 V10.1.0 (Mar. 2011); "3rd Generation Partnership Project; Technical Specification Group Radio Access Network; Evolved Universal Terrestrial Radio Access (E-UTRA); Physical layer; Measurements (Release 10)"; 13 pgs.
3GPP TSG RAN WG4 (Radio) Meeting #51; San Francisco, CA; May 4-8, 2009; "Simulation assumptions and parameters for FDD HeNB RF requirements"; R4-092042; 8 pgs.
3GPP TS 36.331 V10.1.0 (Mar. 2011); 3rd Generation Partnership Project; Technical Specification Group Radio Access Networks; Evolved Universal Terrestrial Radio Access (E-UTRA); Radio Resource Control (RRC); Protocol specification (Release 10); 290 pgs.
ETSI TS 136 214 V10.1.0 (Apr. 2011); "LTE; Evolved Universal Radio Access (E-UTRA); Physical layer; Measurements (3GPP TS 36.214 version 10.1.0 Release 10)"; 15 pgs.

* cited by examiner

*Primary Examiner* — Phuong Phu
(74) *Attorney, Agent, or Firm* — Harrington & Smith

(57) ABSTRACT

An apparatus and a method are described, in which a plurality of signals is received via plurality of receiver units of a receiver, signal quality and/or power related measurements are performed, and a signal quality and/or power related measurement result is generated based on a combination of signals received by the receiver units.

17 Claims, 2 Drawing Sheets

RRM MEASUREMENTS FOR UES WITH INTERFERENCE SUPPRESSION RECEIVER

FIELD OF THE INVENTION

The present invention relates to apparatuses, methods and a computer program product for performing signal quality and/or power related measurements, and in more detail to RRM Measurements for user equipments (UEs) with an interference suppression receiver.

RELATED BACKGROUND ART

The following meanings for the abbreviations used in this specification apply:
3GPP 3$^{rd}$ generation partnership project
CDF Cumulative distribution function
CSG Closed subscriber group
EGC Equal gain combining
eNB enhanced Node-B
HeNB Home enhanced Node-B
HetNet Heterogeneous network
IRC Interference rejection combining
LTE Long term evolution
LTE-A LTE-Advanced
MRC Maximum ratio combining
RRM Radio resource management
RSSI Received signal strength indicator
RSRP Reference signal received power
RSRQ Reference signal received quality
SC Selection combining
SINR Signal to interference plus noise ratio
TS Technical specification
UE User equipment (same as terminal)

Embodiments of the present invention relate to LTE UE RRM measurements to facilitate efficient mobility decisions. According to 3GPP TS 36.214, the following RRM measurements are supported by an LTE UE:

1) Reference Signal Received Power (RSRP), which is the linear average over the power contribution (in [W]) of the resource elements that carry cell-specific reference signals within the considered measurement frequency bandwidth.
2) Received Signal Strength Indicator (RSSI), which comprises the linear average of the total received power (in [W]) observed only in OFDM symbols containing reference symbols for antenna port 0, in the measurement bandwidth, over N number of resource blocks from all sources, including co-channel serving and non-serving cells, adjacent channel interference, thermal noise etc.
3) Reference Signal Received Quality (RSRQ), which is defined as N×RSRP/RSSI, where N is the number of resource blocks for the RSSI measurement.

Based on these measurements, handover between cells, assignment of component carriers, etc. could be performed accordingly.

However, for certain receiver configurations, for example when interference rejection combining (IRC) is applied at the receiver side, a mismatch between the actual SINR condition and the RSRP/RSSI/RSRQ measurements may occur due to the specific advantages achieved by applying IRC. Hence, there is a need to overcome this problem.

SUMMARY OF THE INVENTION

Embodiments of the present invention aim to provide a measurement procedure by which a signal quality and/or power related measurement can be effected in a suitable manner for a particular receiver.

According to a first aspect of the present invention, this is accomplished by an apparatus and by a method, in which a plurality of signals is received via plurality of receiver units of a receiver, signal quality and/or power related measurements are performed, and a signal quality and/or power related measurement result is generated based on a combination of signals received by the receiver units.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

As mentioned above, for certain receiver configurations, for example when interference rejection combining (IRC) is applied at the receiver side, a mismatch between the actual SINR condition and the RSRP/RSSI/RSRQ measurements may be caused. Namely, an IRC receiver could effectively cancel up to $N_{rx}-1$ strongest interferences ($N_{rx}$ is the number of receiving antennas), and improves the user's radio link quality.

Figure 1:
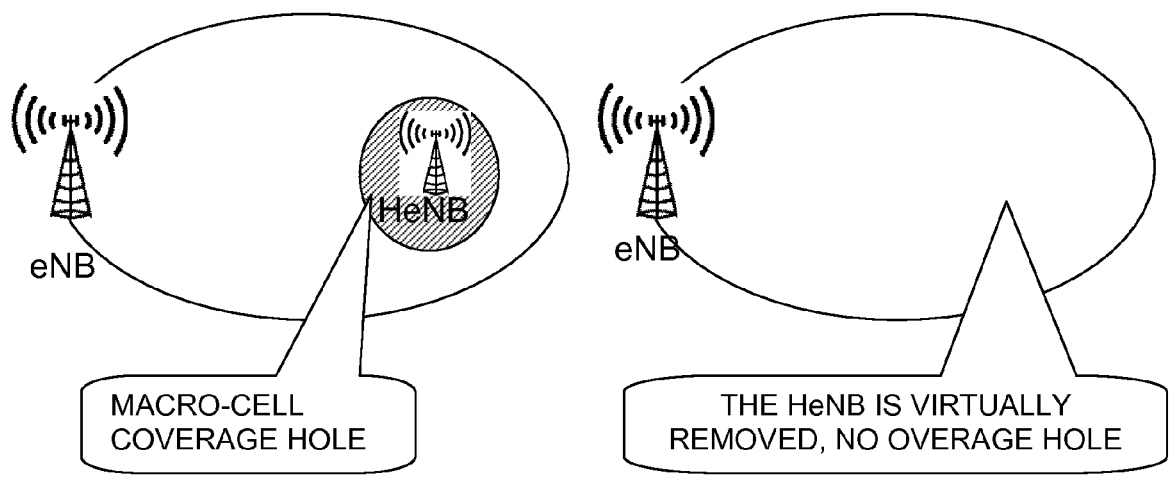
FIG. 1 shows a basic diagram in order to illustrate how by means of IRC one strong interference can be suppressed.

An example of IRC receiver performance in a heterogeneous network (HetNet) scenario with macro-eNB and one strong co-channel CSG HeNB is shown in FIG. 1. The left case corresponds to a case without IRC, where the co-channel HeNB creates heavy interference to users within its dominance area, causing the well-known coverage-hole problem. However, with IRC (the right case), the interference from the co-channel HeNB is heavily suppressed (nearly cancelled); therefore the coverage-hole problem does not exist. If the traditional measurements of RSRP, RSSI or RSSQ are used to decide the user ratio link quality, they may over protect the users near the HeNB.

Figure 2A:
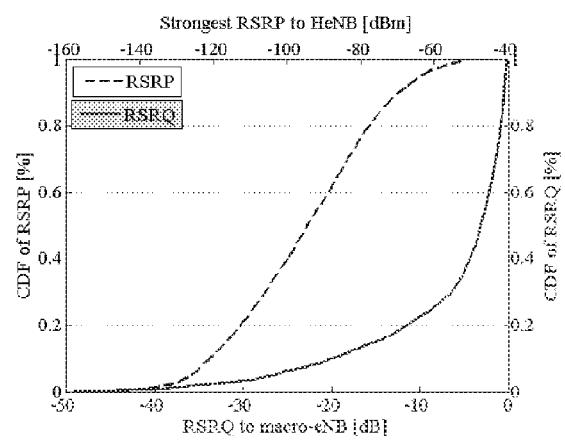
FIGS. 2A and 2B show a performance statistic in a heterogeneous network with MRC or IRC receiver.
Figure 2B:
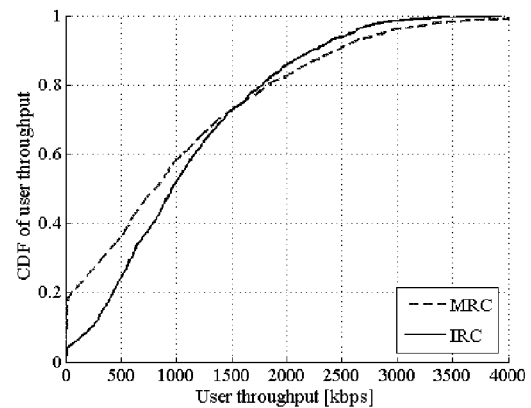

The RSRP, RSRQ and user throughput statistic is shown in FIG. 2, using the macro plus dual-stripe HeNB building scenario (as specified in 3GPP R4-092042), with 10 MHz bandwidth and 1×2 antenna configuration. 10 users exist per macro-cell. The performance with a Maximum Ratio Combining (MRC) receiver is used for reference. In particular, FIG. 2A shows the RSRP and RSRQ statistic, and FIG. 2B shows the CDF of the user throughput.

It can clearly be seen that, while a macro-user is suffering from strong HeNB interference (high RSRP) and poor RSRQ, an IRC receiver helps to improve the SINR quality, and achieves fairly good throughput. E.g., a user with −20 dB RSRQ could still be served when IRC is used, achieving a throughput of around 250 kbps. This clearly indicates RSRQ is not an accurate quality measurement with the IRC receiver.

According to certain embodiments of the present invention, this problem is overcome in that the receiver capability is reflected in the UE RRM measurements to ensure accurate and robust mobility performance. Studies of the inventors have shown that the latter is especially important for the above-described HetNet scenarios when having advanced UE receivers with e.g. interference capabilities such as interference rejection combining (IRC). For the HetNet scenarios, the UE is often subject to only one dominant interferer, which may be an interferer that the IRC receiver is capable of nearly completely suppressing. As the dominant interferer naturally changes depending on the UE's serving cell selection, it is of paramount importance to take such effect into account in the serving cell selection decision. Therefore, according to embodiments of the present invention, the receiver performance is directly taken into account in the UE RRM measurements.

In the following, an apparatus according to an embodiment is described by referring to FIG. 3.

Figure 3:
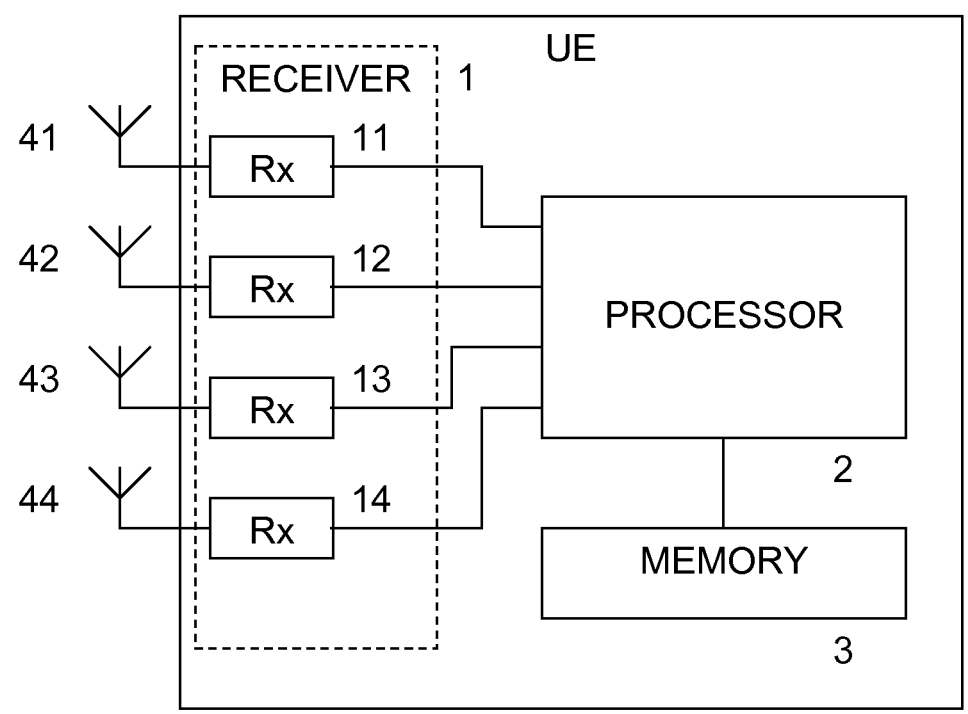
FIG. 3 shows a configuration of a user equipment according to an embodiment of the present invention.

FIG. 3 shows an apparatus, which may be or may be part of a user entity (UE), for example. The UE comprises a receiver 1, which includes a plurality of receiver units 11 to 14 (indicated by Rx in the figure).

Moreover, the UE comprises a processor 2 and may also comprise a memory 3. The memory 3 may store data and programs in order to enable the processor to carry out functions as described in the following.

The processor 2 is configured to perform signal quality and/or power related measurements, and to generate a signal quality and/or power related measurement result based on a combination of signals received by the receiver units.

An example for a signal quality related measurement result is a received signal strength indicator (RSSI) or a reference signal received quality (RSRQ), and an example for a power related measurement result is a reference signal received power (RSRP). However, also other suitable signal quality and/or power related measurement results are applicable.

The receiver units 11 to 14 may be connectable to antennas 41 to 44.

For example, UE antenna combination may be used, so that the measurement result is the measurement result of UE antenna combination. Moreover, in case of an IRC receiver as described above, the RSRP, RSSI and RSRQ measurements may be modified as will be described below.

In particular, according to certain embodiments, a new RRM UE measurement definition is proposed to be used, together with the IRC receiver. It includes:

1) The RSRP measurement will remain the same. For some events that are based on RSRP measurement (e.g., Event A4, A5 in 3GPP TS 36.331), whenever the strongest interfering RSRP is used in the current specification, an IRC receiver should use the $N_{rx}$-th strongest interfering RSRP.

That is, in the example as shown in FIG. 3, the number of receiving antennas $N_{rx}$ is four. Hence, in this case the IRC receiver should use the fourth strongest interfering RSRP. Namely, according to the present embodiment, there is one RSRP measurement towards each interfering node, and the fourth strongest measurement is selected, instead of the first one.

2) Whenever RSSI is used in the current specification, an IRC receiver should use $RSSI_{IRC}$ that neglects the interference from the $N_{rx}-1$ strongest interfering cells.

That is, with respect to the example shown in FIG. 3, the three strongest interfering cells can be neglected.

3) Whenever the RSRQ is used in the current specification, an IRC receiver should use $RSRQ_{IRC}=N\times RSRP/RSSI_{IRC}$.

4) A network could be configured to use either RSRP or RSRQ measurement. In a scenario with one dominant interference and an IRC receiver, it is recommended to use $RSRQ_{IRC}$ instead of the RSRP measurement.

The example above describes a modification of the RSSI (and therefore also the RSRQ) definition for the special case where IRC is used. A further generalization would be to define the RSRP and the RSSI measurement as follows:

RSRP is the received symbol reference power after UE antenna combining, but otherwise identical to the current definition in 3GPP TS 36.214.

RSSI is the received signal strength indicator after UE antenna combining, but otherwise identical to the current definition in 3GPP TS 36.214.

By using the above definitions, the RRM measurement definitions would automatically take the receiver effects into account. It is noted that from the above definition that RSSI would now depend on the antenna weights applied at the UE. Thus, when the UE computes RSRQ from a certain cell, it shall assume the same antenna weights for RSRP and RSSI. The latter is important since the RSSI will now vary significantly depending which cell the UE is potentially connected.

Thus, according to embodiments of the present invention, an apparatus and a method is provided by which the receiver performance is reflected in the UE RRM measurements, so that a more suitable radio resource management for a certain UE is possible.

It is noted that certain embodiments described above are described by referring to IRC. However, the general idea is also applicable to other combination procedures, for example Maximum ratio combining (MRC). Namely, also in MRC, it is possible to set the RSRP (or RSSI) as the received symbol reference power (or received signal strength indicator) after UE antenna combining, for example. Furthermore, the general idea (e.g., RSRP/RSSI considering antenna combining) can be applied to all kinds of combining techniques, including SC (selection combining), EGC (equal gain combining) or any others.

In addition, embodiments are described with respect to LTE and LTE-A. However, this is only an example, and the present invention may be applied in embodiments according to any radio access technology, in which signal quality and/or power related measurements are performed and a signal quality and/or power related measurement result is generated.

According to a first aspect of several embodiments of the invention, an apparatus is provided which comprises
  a receiver including a plurality of receiver units,
  a processor configured to perform signal quality and/or power related measurements,
  wherein the processor is configured to generate a signal quality and/or power related measurement result based on a combination of signals received by the receiver units.

The first aspect may be modified as follows:

The signal quality and/or power related measurement result may be a reference signal received power and/or a reference signal strength indicator.

The receiver units may receive signals from antennas, and the combination may be antenna combining.

The receiver may be configured to apply interference rejection combination.

The processor may be configured to measure a plurality of reference signal received power values and to determine strongest interfering reference signal received power values, and to use an $N_{rx}$th strongest interfering reference signal received power as the strongest interfering reference signal received power, wherein $N_{rx}$ indicates the number of antennas.

The processor may be configured to generate a reference signal strength indicator value by neglecting interference from $N_{rx}-1$ strongest interfering cells, wherein $N_{rx}$ indicates the number of antennas.

The processor may be configured to calculate a reference signal received quality based on a division of a reference signal received power by the calculated reference signal strength indicator value.

A network configuration may specify using either reference signal received power measurement or reference signal received quality measurement, and in this case the processor may be configured to use the calculated reference signal received quality.

According to a second aspect of several embodiments of the invention, a method is provided which comprises receiving a plurality of signals via plurality of receiver units of a receiver, performing signal quality and/or power related measurements, and generating a signal quality and/or power related measurement result based on a combination of signals received by the receiver units.

The second aspect may be modified as follows:

The signal quality and/or power related measurement result may be a reference signal received power and/or a reference signal strength indicator.

The receiver units may receive signals from antennas, and the combination may be antenna combining.

In the method, interference rejection combination may be applied applied.

The method may further comprise measuring a plurality of reference signal received power values, determining strongest interfering reference signal received power values, and using an $N_{rx}$th strongest interfering reference signal received power as the strongest interfering reference signal received power, wherein $N_{rx}$ indicates the number of antennas.

The method may further comprise generating a reference signal strength indicator value by neglecting interference from $N_{rx}-1$ strongest interfering cells, wherein $N_{rx}$ indicates the number of antennas.

The method may further comprise calculating a reference signal received quality based on a division of a reference signal received power by the calculated reference signal strength indicator value.

A network configuration may specify using either reference signal received power measurement or reference signal received quality measurement; in this case the method may further comprise using the calculated reference signal received quality.

According to a third aspect of several embodiments of the invention, an apparatus is provided which comprises receiving means including a plurality of receiver units, means for performing signal quality and/or power related measurements, and means for generating a signal quality and/or power related measurement result based on a combination of signals received by the receiver units.

The third aspect may be modified as follows:

The receiving means may comprise means for applying interference rejection combination.

The apparatus may comprise means for measuring a plurality of reference signal received power values, for determining strongest interfering reference signal received power values, and for using an $N_{rx}$th strongest interfering reference signal received power as the strongest interfering reference signal received power, wherein $N_{rx}$ indicates the number of antennas.

The apparatus may further comprise means for generating a reference signal strength indicator value by neglecting interference from $N_{rx}-1$ strongest interfering cells, wherein $N_{rx}$ indicates the number of antennas.

The apparatus may further comprise means for calculating a reference signal received quality based on a division of a reference signal received power by the calculated reference signal strength indicator value.

A network configuration may specify using either reference signal received power measurement or reference signal received quality measurement; and in this case the apparatus may comprise means for using the calculated reference signal received quality.

Further modifications may be similar as modifications of the first aspect.

According to a fourth aspect of several embodiments of the present invention, a computer program product is provided which comprises code means for performing a method according to any one of the first aspect and its modifications when run on a processing means or module.

The computer program product may be embodied on a computer-readable medium, on which the software code portions are stored, and/or the program may be directly loadable into a memory of the processor.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, UE etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising
a receiver including a plurality of receiver units,
a processor configured to perform signal quality and/or power related measurements,
wherein the processor is configured to apply interference rejection combining to suppress interference of a combination of signals received by the receiver unit, and configured to generate a signal quality and/or power related measurement result based on the combination of signals,
and wherein the processor is configured to perform radio resource management measurements dependent on the result based on the combination of signals received by the receiver units when selecting a serving cell, and wherein the serving cell is selected dependent on interference suppression resulting from applying the interference rejection combining.

2. The apparatus according to claim 1, wherein the signal quality and/or power related measurement result is reference signal received power and/or a reference signal strength indicator.

3. The apparatus according to claim 1 wherein the receiver units receive signals from antennas, and the combination is antenna combining.

4. The apparatus according to claim 1, wherein the receiver is configured to apply interference rejection combination.

5. The apparatus according to claim 4, wherein the processor is configured to measure a plurality of reference signal received power values and to determine strongest interfering reference signal received power values, and to use an $N_{rx}$th strongest interfering reference signal received power as the strongest interfering reference signal received power, wherein $N_{rx}$ indicates a number of antennas.

6. The apparatus according to claim 4, wherein the processor is configured to generate a reference signal strength indicator value using a reference signal from a least strongest interfering cell of $N_{rx}$ strongest interfering cells, wherein $N_{rx}$ indicates a number of antennas.

7. The apparatus according to claim 6, wherein the processor is configured to calculate a reference signal received quality based on a division of a reference signal received power by the calculated reference signal strength indicator value.

8. The apparatus according to claim 4, wherein a network configuration specifies using either reference signal received power measurement or reference signal received quality measurement, wherein the processor is configured to use the calculated reference signal received quality.

9. A method comprising
receiving a plurality of signals via plurality of receiver units of a receiver,
performing signal quality and/or power related measurements,
generating a signal quality and/or power related measurement result based on a combination of signals received by the receiver units including applying interference rejection combining to suppress interference of the combination of signals, and
performing radio resource management measurements dependent on the result based on the combination of signals received by the receiver units when selecting a serving cell, and wherein the serving cell is selected dependent on interference suppression resulting from applying the interference rejection combining.

10. The method according to claim 9, wherein the signal quality and/or power related measurement result is reference signal received power and/or a reference signal strength indicator.

11. The method according to claim 9 wherein the receiver units receive signals from antennas, and the combination is antenna combining.

12. The method according to claim 9, wherein interference rejection combination is applied.

13. The method according to claim 12, further comprising
measuring a plurality of reference signal received power values,
determining strongest interfering reference signal received power values, and
using an $N_{rx}$th strongest interfering reference signal received power as the strongest interfering RSRP, wherein $N_{rx}$ indicates a number of antennas.

14. The method according to claim 12, further comprising
generating a reference signal strength indicator value using a reference signal from a least strongest interfering cell of $N_{rx}$ strongest interfacing cells, wherein $N_{rx}$ indicates a number of antennas.

15. The method according to claim 14, further comprising
calculating a reference signal received quality based on a division of a reference signal received power by the calculated reference signal strength indicator value.

16. The method according to claim 12, wherein a network configuration specifies using either reference signal received power measurement or reference signal received quality measurement, and the method further comprises using the calculated reference signal received quality.

17. A computer program product embodied in a non-transitory computer memory and comprising instructions the execution of which by a processor results in performing operations that comprise:
receiving a plurality of signals via plurality of receiver units of a receiver,
performing signal quality and/or power related measurements,
generating a signal quality and/or power related measurement result based on a combination of signals received by the receiver units including applying interference rejection combining to suppress interference of the combination of signals, and
performing radio resource management measurements dependent on the result based on the combination of signals received by the receiver units when selecting a serving cell, and wherein the serving cell is selected dependent on interference suppression resulting from applying the interference rejection combining.

* * * * *

UNITED STATES PATENT AND TRADEMARK OFFICE
CERTIFICATE OF CORRECTION

| | |
|---|---|
| PATENT NO. | : 9,258,068 B2 |
| APPLICATION NO. | : 14/113443 |
| DATED | : February 9, 2016 |
| INVENTOR(S) | : Wang et al. |

Page 1 of 1

It is certified that error appears in the above-identified patent and that said Letters Patent is hereby corrected as shown below:

Claims

Claim 14, col. 8, line 39 "interfacing" should be deleted and --interfering-- should be inserted.

Signed and Sealed this
Seventeenth Day of May, 2016

Michelle K. Lee
*Director of the United States Patent and Trademark Office*